March 20, 1928.  1,662,940

F. SIEVERN

CHAIN HOOK

Filed Sept. 28, 1927  2 Sheets-Sheet 1

INVENTOR
Fredrick Sievern
By Archworth Martin,
Attorney

March 20, 1928.　　　　　　　　　　　1,662,940
F. SIEVERN
CHAIN HOOK
Filed Sept. 28, 1927　　　2 Sheets-Sheet 2
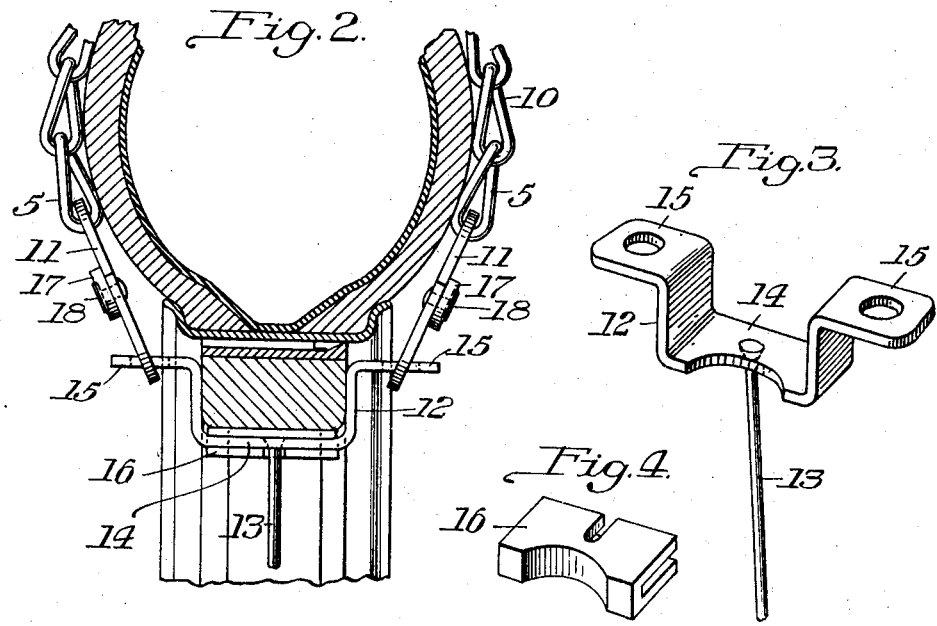
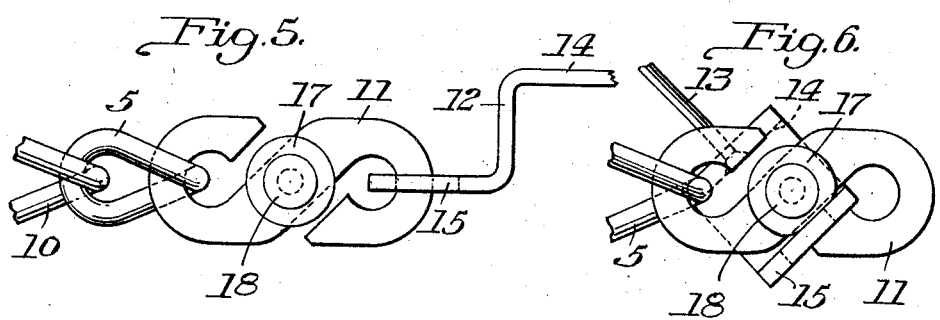
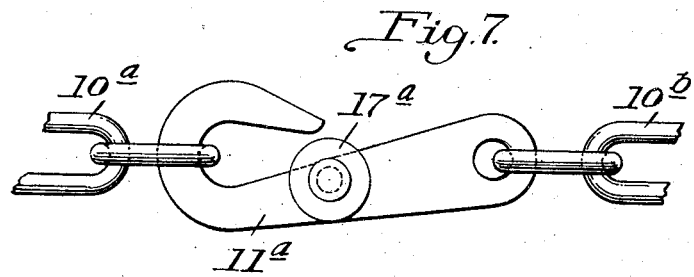
INVENTOR
Fredrick Sievern
By Archworth Martin,
Attorney.

Patented Mar. 20, 1928.

1,662,940

UNITED STATES PATENT OFFICE.

FREDRICK SIEVERN, OF McKEESPORT, PENNSYLVANIA.

CHAIN HOOK.

Application filed September 28, 1927. Serial No. 222,440.

My invention relates to chain hooks and is especially suited for use as fastenings for cross or tread chains of anti-skid devices, but is suitable also for employment in various other relations.

One object of my invention is to provide a chain hook of simple form which can be readily disconnected, but which is not likely to become accidentally displaced.

Another object of my invention is to provide a chain hook having a keeper which may be rigidly secured in place, but which is yieldable to permit passage of a chain hook or the like to connect or disconnect the same.

Another object of my invention is to provide a hook device for anti-skid chains and the like which will permit rotative movements of the chain to such degree as will result in distribution of wear on the chain hooks to thereby increase the life of the chain and prevent the wearing of flat surfaces thereon.

Still another object of my invention is to simplify and improve generally the structure and operation of devices of the character referred to.

Figure 1:
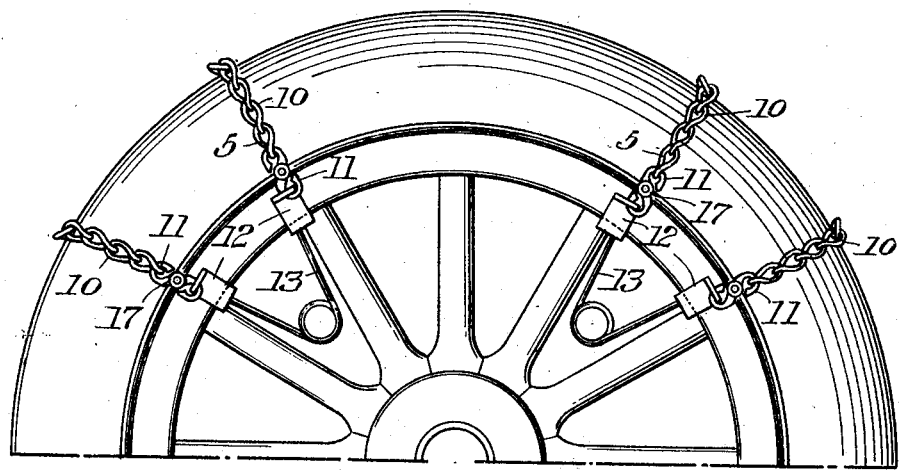
Figure 8:
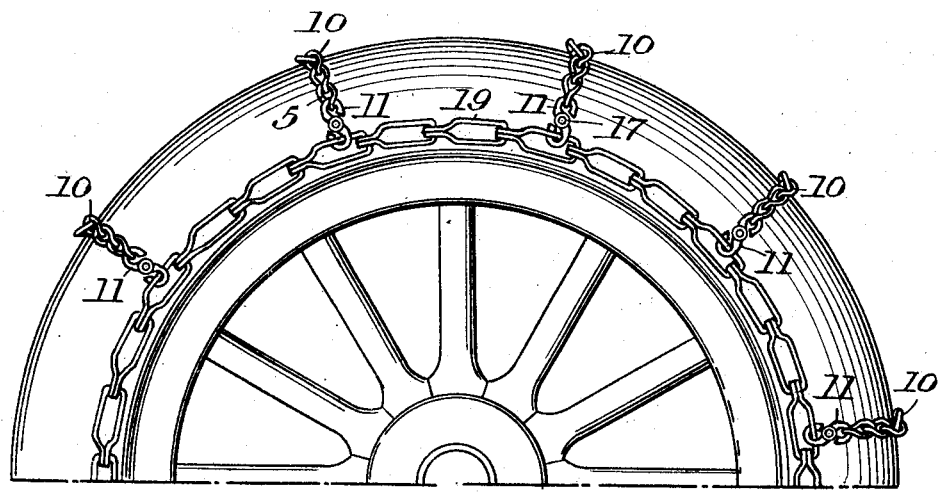

Some of the forms which my invention may take are shown in the accompanying drawing, wherein Figure 1 is a side elevational view of a portion of a vehicle wheel to which my invention is applied; Fig. 2 is a vertical sectional view of the structure of Fig. 1; Fig. 3 is a perspective view, on an enlarged scale, of one of the hook-supporting yokes of Fig. 1; Fig. 4 is a perspective view, on an enlarged scale, of one of the cushioning pads for protecting the wheel spokes against wear of the yokes; Fig. 5 is a view, on an enlarged scale, showing more clearly the manner in which the hooks are connected to the yokes and the cross chains; Fig. 6 is a view similar to Fig. 5, but showing the position to which the yokes may be turned to disengage them from the hooks; Fig. 7 is a view showing a modified form of hook, and Fig. 8 is a view similar to Fig. 1, but showing the hook device employed in connection with an anti-skid structure having side chains.

Referring to Figs. 1 to 6, I show my improved hook as employed in connection with an anti-skid device similar to that described in my Patent No. 1,563,666, issued Dec. 1, 1925.

Cross chains 10 are placed across a wheel tread in the usual manner and their ends are connected by hooks 11 to yokes 12, the yokes 12 partially embracing the felly and spokes of the wheel and being yieldably held in position by springs 13, as explained in my patent above referred to.

Each of the yokes 12 is provided with an intermediate or body portion 14 and perforated extensions 15, the midportions 14 of each yoke fitting against the felly of the wheel and the extensions 15 serving as eye portions for supporting the hooks 11. The outer ends of the hooks 11 are connected to the ends of tread chains 10. Pads 16 of rubber or other suitable material are placed upon the depressed portions 14 of the yokes so as to prevent abrasion of the wheel spokes, the pads being grooved or recessed so as to partially embrace such portions 14.

To each hook 11, I secure a block or disc 17 of rubber or other yieldable material, by means of a rivet 18 whose outer end is widened or provided with a washer that may be compressed against the washer by hammering the rivet to spread the disc when desired, in order to reduce the space between the periphery of the disc 17 and the adjacent ends of the hook. The block may also be turned slightly to bring unworn portions thereof opposite to the hook ends.

The distance between the disc 17 and the ends of the hook is such that it will be compressed slightly when a chain link or the yoke 12 is pushed into or out of position within the hook. The yielding quality of the disc permits engagement or disengagement of the chain links and the yoke by manual pressure, but the force required is such that the parts will not become accidentally detached. In order to disengage the yoke 14, it must be turned to approximately the position shown in Fig. 6 with the extensions 15 lying in a plane perpendicular to the plane of the hook, since the width of such extensions is too great to permit them to pass between the back-turned hook end and the body of the hook, while they are of a thickness slightly less than the space between said hook end and the intermediate or body portion.

The end links 5 of the cross chains 10 have considerable rotative movement in the hooks and the hooks can turn somewhat in the eye portions 15, so that there is greater rolling movement of the chains upon the wheel tread than in various other types of anti-skid devices, with the result that there will be more uniform wear of the chain links and they will consequently have a much longer life than if a given surface of each link were brought into contact with the road upon each revolution of the wheel.

It will also be seen that there are no moving parts to the hook such as the springs of ordinary snap hooks, and hence no parts to become displaced or be rigidly held against operative movements through clogging or freezing of mud or snow.

The hook 11 normally lies flatwise with respect to the sides of the wheel, and is less likely to become caught against obstructions than if it were disposed in a plane transverse to the plane of the wheel.

Referring to Fig. 7, I show a rubber washer $17^a$ employed in connection with a single hook $11^a$ as distinguished from the double hook 11. In this case, a chain $10^a$ may be passed into the hook against the yielding force of the washer $17^a$ as in the other figures, another chain end $10^b$ being permanently attached to the eye of the hook.

In Fig. 8, I show the hooks 11 as employed for attaching the cross chains 10 to side chains 19 of any well-known form, the hook being disengaged from its supporting link in the side chain 19 in substantially the same manner as it is disconnected from the end links 5.

I claim as my invention:—

1. Hook structure, comprising a body portion having an extremity bent to hook form, a disc-like member of yieldable material secured to the body portion and projecting beyond the said body portion to a point adjacent to said extremity, means permitting rotatable adjustment of said disc-like member, and means for compressing the disc axially and spreading the same radially.

2. Hook structure, comprising a body portion having an extremity bent to hook form, a member of yieldable material secured to the body portion and projecting beyond the said body portion to a point adjacent to said extremity, and means carried by said body portion for compressing said material to spread the same toward the said extremity.

3. Hook structure, comprising a member of S form to provide a hook portion at each end thereof, a yieldable element secured to the mid portion of said member and projecting to points adjacent to each of the extremities, to yieldably resist passage of chain links and the like into or out of hooked position, and means for compressing and spreading the disc toward both of said extremities.

4. Hook structure comprising a body portion having an extremity bent to hook form, a disc-like member of yieldable material disposed against one side of the body portion and projecting beyond said body portion to a point adjacent to the said extremity, and a rivet-like member carried by the hook body and extending through the disc and having a head portion positioned for compression against the disc to spread the same.

In testimony whereof I, the said FREDRICK SIEVERN, have hereunto set my hand.

FREDRICK SIEVERN.